United States Patent [19]

Gordy et al.

[11] 4,039,749

[45] Aug. 2, 1977

[54] SPREAD SPECTRUM DEMODULATOR

[75] Inventors: Robert S. Gordy, Largo; David E. Sanders, St. Petersburg, both of Fla.

[73] Assignee: NCR Corporation, Dayton, Ohio

[21] Appl. No.: 611,366

[22] Filed: Sept. 8, 1975

[51] Int. Cl.² ............................................ H04L 27/22
[52] U.S. Cl. .................................... 178/69.1; 325/320; 325/473
[58] Field of Search ...................... 325/30, 42, 65, 320, 325/321, 473, 474, 476; 178/69.5 R, 66, 67, 68

[56]  References Cited
U.S. PATENT DOCUMENTS

| 3,350,644 | 10/1967 | McNair | 325/42 X |
| 3,478,268 | 11/1969 | Coviello | 325/65 |
| 3,916,313 | 10/1975 | Lowry | 325/65 X |

*Primary Examiner*—Benedict V. Safourek
*Attorney, Agent, or Firm*—J. T. Cavender; Albert L. Sessler, Jr.; Edward Dugas

[57] ABSTRACT

The present invention is directed to a demodulator for demodulating a wideband spread spectrum four-phase PSK (phase shift keyed) modulated carrier signal wherein the phase modulation was in response to an encoded data signal and wherein the encoding of the data signal and spreading of the spectrum was accomplished by the mixing of the data signal with a pseudo-random pulse sequence (PN-sequence).

The demodulator is comprised in part of a generator means for providing a pseudo-random pulse sequence corresponding to the sequence used to encode the data signal; and an encoding means for converting the provided PN-sequence into a four-phase PN sequence. A correlation means correlates the generated four-phase PN sequence against the received four-phase PSK modulated carrier signal to provide a two-phase collapsed spectrum signal. A switching means interposed between correlation means and the generator means switches two of the four phases of the four phase PN-sequence signal applied to the correlation means until proper phasing is achieved.

12 Claims, 5 Drawing Figures

SPREAD SPECTRUM DEMODULATOR

CROSS REFERENCE TO RELATED PATENT APPLICATIONS

The present patent application is related to a patent application Ser. No. 611,367 entitled "IMPROVED SPREAD SPECTRUM DEMODULATOR," by R. S. Gordy, et al. filed on even data with the present patent application and now U.S. Pat. No. 4,017,798.

BACKGROUND OF THE INVENTION

The present invention is directed to the field of demodulators and more particularly to a spread spectrum demodulator for demodulating a spread spectrum four-phase PSK (phase shift keyed) modulated carrier signal.

In a bi-phase PSK communication system the phase of a reference carrier signal is shifted (encoded) in accordance with the coding of a data signal. As an example, if a binary 0 is to be transmitted the phase of the reference carrier signal would be unshifted, or 0°; and if a binary 1 were to be transmitted the phase of the reference carrier signal would be shifted 180°.

Once the carrier signal is phase modulated it may be transmitted to a receiver over a transmission line or a radio link.

Aside from bi-phase PSK modulation, quadrature (four) phase modulation may also be used. In a quadrature phase communication system the information signal, which is generally a string of binary bits, is proportioned into baud intervals, that is, into groups of two binary bits. The succession of phase changes occurring in successive baud intervals is then used to modulate the reference carrier signal in four phases.

For example, four digital symbols such as 00, 01 10 and 11 may be transmitted for quadrature phase modulation of the carrier signal. Each of the four different phases of the carrier signal may be used to represent a different one of the four digital symbols. That is, the phase angle 0° can represent the digital symbol, 00; and the phase angles 90°, 180°, and 270°, can represent the digital symbols 01, 11 and 10, respectively.

In certain communication environments, it is necessary to provide a signal which cannot be interfered with, that is, a signal which is secure and cannot be jammed, interrupted, or received by an unauthorized receiver.

The security afforded to a PSK signal is somewhat limited in that a receiver, having its local reference carrier signal synchronized to the received PSK signal, will be able to demodulate the received PSK signal to arrive at the data signal. In addition, once the frequency of the carrier signal or the frequency spectrum of the data signal is known, it is a relatively simple procedure for a jammer to intentionally disrupt communications. In order to minimize this particular weakness in digital communications systems a scheme has been devised whereby the bandwidth of the transmitted signal is spread over a larger bandwidth than that of the data signal. This is generally accomplished by mixing the data signal with a pseudo-random sequence of pulses having a bandwidth greater than the bandwidth of the data. The mixed signal is then used to phase modulate a reference carrier signal. Transmission of this type of spread spectrum signal makes it exceedingly difficult to determine the data carrying components of the transmitted signal and therefore, in turn, to achieve effective jamming. In order to receive a spread spectrum signal that is encoded in the above manner, it is necessary to know he particular sequence of the pseudo-random sequence of pulses that was used to spread the spectrum of the data signal. The present invention is directed towards such a system. Efficient decoding in the receiver requires an identical code generator for generating the pseudo-random sequence, which code generator must be in precise time synchronization with the pseudo-random sequence of the spread spectrum signal.

A publication which provides an insight into the state of the art of spread spectrum signal processing is entitled "Surface Acoustic Wave Devices And Applications," by B. J. Hunsinger, published in the November 1973 issue of Ultrasonics, page 25 to page 263. Another publication of interest is entitled "Optimal Binary Sequences For Spread Spectrum Multiplexing, " by R. Gold published in the IEEE Transactions On Information Theory, October 1967, pages 619 to 621.

SUMMARY OF THE INVENTION

In the present invention a pseudo-random sequence of binary pulses is used to encode a data signal into four-phase signals. The encoded signals are then used to modulate the phase of a carrier signal in four phases so as to spread the spectrum of the modulated signal to that of the pseudo-random sequence.

Demodulation of a signal which is modulated utilizing this technique is accomplished by dividing the received signal along two signal paths, one of which shifts the phase of the received signal by 90°. A pair of mixers are positioned, one each, in each of the signal paths.

Means are provided for generating a local pseudo-random (PN) sequence of pulses, which sequence corresponds to the sequence used to spread the spectrum of the transmitted signal. Encoding means are provided for splitting the pseudo-random sequence into quadrature related signals. A switching means connects the quadrature related signals to respective inputs of the two mixers. A locking signal activates the switching means to periodically reverse the connections of the quadrature related signals to the two mixers for an unlocked condition and to maintain the connections in one position for a locked condition. The output signals from the two mixers are summed together in a summing circuit to provide the demodulator output signal which signal is a two-phase non-spread PSK modulated signal. A lock detector provides the locking signal by detecting the degree of synchronization between the local generated PN sequence and the PN sequence contained in the received signal. A synchronizing control loop responds to the degree of synchronization so as to drive the local PN sequence generator into synchronization with the PN sequence contained in the received signal.

The output signals from the mixers are signals corresponding to a four-phase PSK modulated signal of a narrow bandwidth in that each mixer removes one-half of the pseudo-random modulation such that the spread bandwidth of the PN sequence is totally removed from the received signal when the signal is summed by the summing circuit. The summing circuit also, by combining the signals from the mixers, converts the phase of the summed signals from four-phase to two-phase. Therefore, the output signal from the summing circuit is a two-phase collapsed spectrum PSK modulated signal, which signal may be further demodulated using well known demodulation techniques to detect the data signal.

From the foregoing, it can be seen that it is a primary object of the present invention to provide an improved spread spectrum demodulator.

It is still another object of the present invention to provide a demodulator for converting four-phase spread spectrum PSK signals into two-phase collapsed spectrum PSK signals.

It is another object of the present invention to provide an improved demodulation system wherein spectrum collapsing is facilitated by phase shifting a received spread spectrum PSK modulated signal as a function of a locally generated pseudo-random sequence signal.

These and other objects of the present invention will become more apparent when taken in conjunction with the following description and drawings in which like characters indicate like parts and which drawings form a part of the present invention.

DESCRIPTION OF THE PREFERRED EMBODIMENTS

Figure 1:
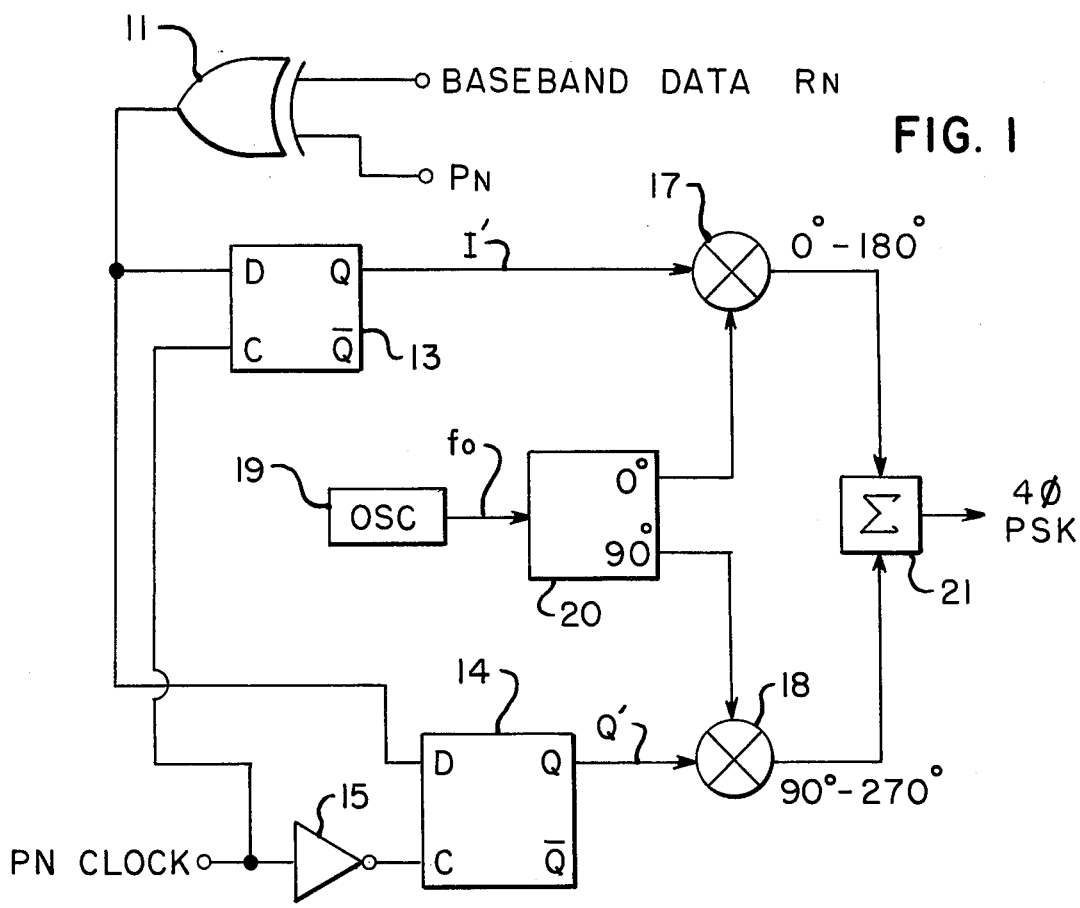
FIG. 1 is a detailed block schematic diagram of a spread spectrum modulator.

Referring to the modulator of FIG. 1; an EXCLUSIVE-OR gate 11 receives at one of its input terminals a baseband (information) data signal having a repetition rate of RN. The baseband data signal may, for example, be a string of binary data bits. The other input to the EXCLUSIVE-OR gate 11 is a pseudo-random pulse sequence PN having a data rate which is greater than the baseband data rate.

The baseband data signal is encoded (mixed) with the pseudo-random pulse sequence in the EXCLUSIVE-OR gate 11 and the encoded output signal from the EXCLUSIVE-OR gate is applied to the D input of the D-type flip-flops 13 and 14. A D-type clocked flip-flop is defined as being the type of flip flop which provides output signals having two output states, for example, a high state (1) and a low state (0); and which is constructed to have at least a single data input terminal designated D; a clock input terminal designated C; and complementary output terminals, designated Q and $\overline{Q}$. The logic state of the signal present at the data input D appears at the Q output after the occurrence of a particular clocking transition and remains at the Q output until the occurrence of the next like clocking transition. In the preferred embodiment of the present invention, the trailing edge of a falling clock pulse is used as the particular clocking transition.

A PN clock signal having a rate that is one-half the rate of the pseudo-random pulse sequence signal PN is applied to the C input of flip-flop 13 and to the input of an inverter 15. The PN clock signal is logically inverted by inverter 15 and applied to the C input of the flip-flop 14. The signal present at the output of the EXCLUSIVE-OR gate 11 is clocked to the Q terminals of the respective flip-flops in a staggered fashion; that is, every even bit of the mixed data and PN sequence signals is applied to the flip-flop 13 with every odd bit of the mixed data and PN sequence signals being applied to the D input of flip-flop 14. The Q output of flip-flop 13 is connected to an input of a balanced mixer 17. The line connecting the two is labeled I'. The Q output from flip-flop 14 is connected to an input of a balanced mixer 18. The line connecting the two is labeled Q'. A carrier oscillator 19 generates a carrier signal of frequency, "fo", which signal is directed to a phase shifting circuit 20. The phase shifting circuit 20 provides two output signals, one of which is shifted 90° in phase with respect to the other signal. The unshifted carrier signal is directed to an input of the balanced mixer 17. The second output signal which is shifted 90° in phase is directed to an input of the balanced mixer 18. In operation, the output signal from the balanced mixer 17 is a signal which shifts in phase to either a 0° phase shift or a 180° phase shift in response to the level of the signal on the I' line. The output signal from the balanced mixer 18 is a signal which shifts in phase to either a 90° phase shift or a 270° phase shift in response to the level of the signal on the Q' line. A summing circuit 21 linearly combines the output signals from the mixers 17 and 18 to provide a four-phase PSK modulated spread spectrum signal, which signal is modulated as a function of the mixed baseband data and the pseudo-random bit sequence signals. The summing circuit 21 may be a summing amplifier of the type disclosed in "Electronic Analog Computers," by Korn and Korn, McGraw Hill, 1952, page 14. The four-phase PSK modulated spread spectrum signal is then transmitted to a receiver utilizing well known transmission techniques.

Recovery of the narrow bandwidth two-phase data signal from the received four-phase PSK modulated spread spectrum signal requires a high degree of correlation between the exact replica of the wideband modulating signals and the received spread spectrum signal. In the preferred embodiment of this invention the wideband modulating signal is the pseudo-random sequence signal. Therefore, a locally generated PN sequence signal must match and be synchronized to the PN sequence portion of the received signal in order to collapse the spectrum of the received signal.

Figure 2:
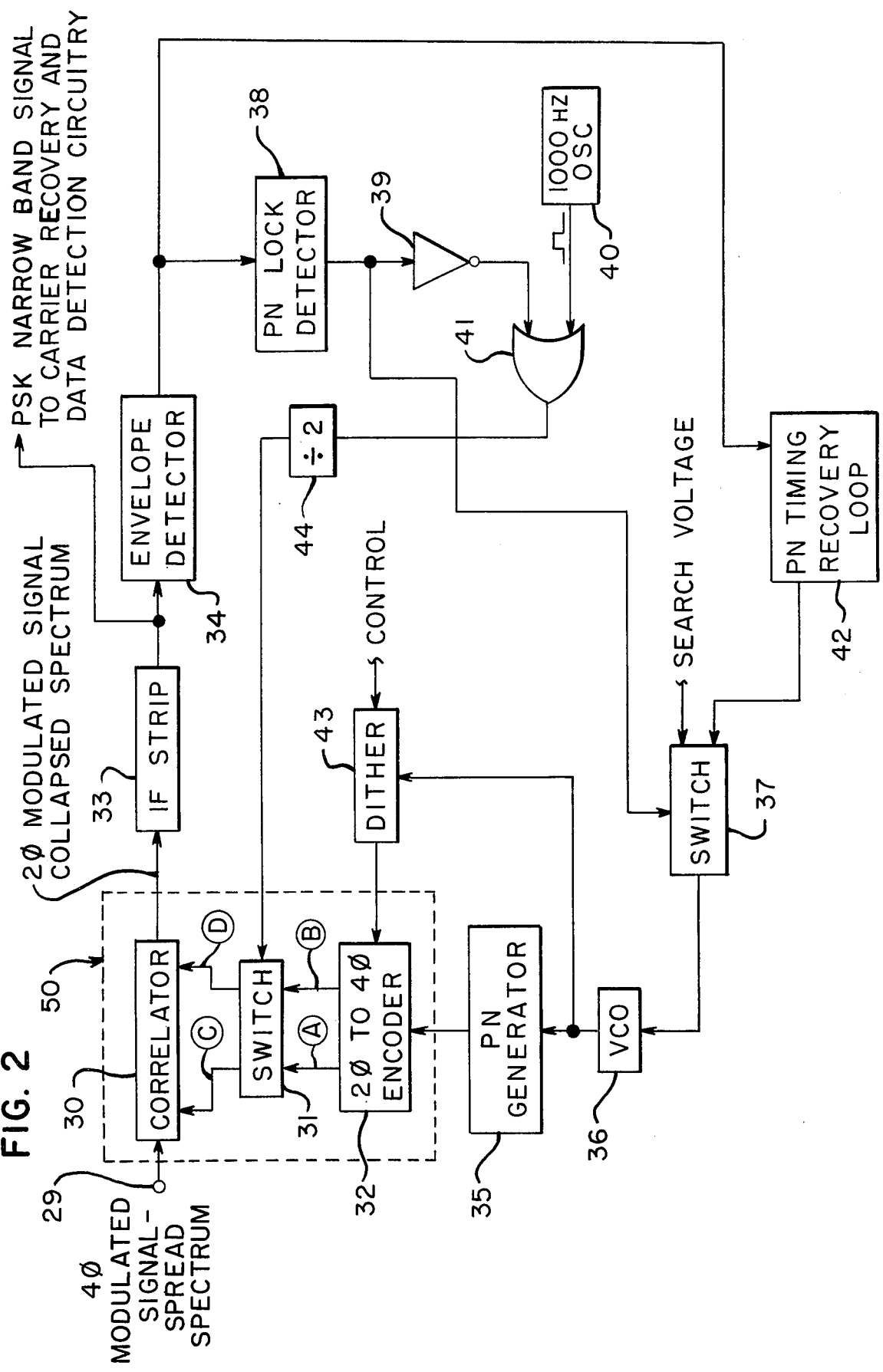
FIG. 2 is a schematic diagram of a portion of a spread spectrum receiver utilizing the demodulator of the present invention.

Referring now to FIG. 2, a four-phase PSK modulated received signal, which signal has a spread spectrum is received by a receiver (not shown) and is applied to the input terminal 29. The input terminal 29 is connected to the input of a demodulator 50. the demodulator 50 is comprised of; a correlator 30, a switching circuit 31 and a two-phase to four-phase encoder 32. The output of the demodulator 50 is taken from the output of the correlator 30. The signal present at that output is a two-phase PSK modulated signal with a collapsed spectrum. The two-phase modulated signal the correlator 30 is received by an IF (intermediate frequency) strip 33. The IF strip 33 may be, for example, a matched filter, which filter operates upon the signal at its input to remove all but the desired signal components. The filtered signal from the IF strip 33 is a two-phase PSK modulated signal having a collapsed spectrum which signal is fed to an envelope detector 34, and to a carrier recovery circuit and to associated data detection circuitry, which circuitry forms no part of the present invention but which circuitry is disclosed in further detail in the copending application referenced in the forward part of this application. The envelope detector 34 provides an output signal which is a function of the envelope of the signal at its input. The detected envelope signal is fed to a PN lock detector circuit 38 and to the input of a PN timing recovery loop circuit 42. The PN lock detector circuit 38 provides a lock condition signal, the level of which indicates the existence, or the non-existence, of a locked condition.

In this application the term "lock condition" means a condition wherein the PN sequence generated in the receiver is matched in a particular phase relationship with the sequence of the PN signal contained in the received signal. The lock condition signal from the lock detector circuit 38 is directed to an inverting amplifier 39 wherein the logic level of the signal is inverted. The inverted signal from the amplifier 39 is applied to the input of an OR gate 41. The OR gate 41 also receives, as an input, a train of pulses which train of pulses is generated by an oscillator 40. In the preferred embodiment of the invention the oscillator 40 provides a pulse train having a repetition rate of 1000Hz. The logic level of the signal from the output of the OR gate is directed to a divide-by-two circuit 44 the output signal of which controls the state of the switch 31. Switch 31 has two states - one connects the lines marked Ⓐ, and Ⓑ, to the lines marked Ⓒ and Ⓓ respectively; the other state reverses the connections such that line Ⓐ is connected to line Ⓓ and line Ⓑ is connected to line Ⓒ.

The switch 31 will be switched to one state when the logic level of the signal from gate 41 is, for example, high and to the other state when the logic level of the signal is low. The logic level of the signal from gate 41 is a function of the lock condition signal from the lock detector 38. When the level of the lock condition signal, from lock detector 38, is low indicating a locked condition, the input signal to the OR gate from inverter 39 is high. The high signal at the input of the OR gate 41 causes the output signal from the OR gate to remain high. The switch 31 will remain in the one state so long as the lock condition signal from the lock detector 38 indicates that a lock condition exists. When the lock condition signal from the lock detector 38 goes high, indicating a loss of lock, the level of the signal at the output of the amplifier 39 goes low. The signal from oscillator 40 passes through the OR gate 41 and toggles the switch 31 from one state to the other. The divide-by-two circuit changes state only when the signal on its input changes state, therefore when a high level signal is received from OR gate 41, the divide-by-two circuit will hold the switch 31 in the position that it is in at the time the high level signal is received, and will not change that position until the next change in level of the signal from the OR gate 41. In partial summary then, although the squarewave pulse train from the oscillator 40 also appears on an input of the OR gate 41 it will be superimposed on to the constant high level signal from the inverting amplifier 39 such that the output signal from the OR gate will remain at a high state and will not switch to a low state until the PN lock detector 38 indicates a loss of lock.

The lock condition signal from the lock detector 38 is also applied to a controlling input of a switch 37. The PN timing recovery loop 42, in response to the envelope detected signal, provides a control signal indicative of the degree of lock, which signal is connected by means of switch 37 to the input of a voltage controlled oscillator (VCO) 36. The VCO 36 provides a squarewave output signal, the rate of which is proportional to the signal received at its input. The squarewave signal from VCO 36 is applied as a clocking signal to the input of a PN generator 35. The PN generator 35 may be a shift register wherein certain stages of the shift register have their signals fed back to the input of the shift register so as to create a pseudo-random sequence of pulses which pulses are taken from the last stage of the shift register. The clocking signal from the VCO 36 is used to clock the pulses through the stages of the shift register. Therefore, if the clock pulses increase in rate, the PN sequence of pulses will increase in rate and conversely, if the clock pulses decrease in rate, the PN sequence of pulses will also decrease in rate. The pseudo-random sequence of pulses from the PN generator 35 are fed to the two-phase to four-phase encoder 32. The PN sequence of pulses is at this point in the system binary in nature that is, the pulses have two states, a high state, and a low state. Applying two phase pulses to a phase modulator will cause the phase modulator to shift between two phases, one phase corresponding to the high level and the other corresponding to the low level. Therefore, a binary signal is considered to be a two-phase signal. The two-phase to four-phase encoder 32 generates at its output terminals labeled Ⓐ and Ⓑ two signals each of which are binary in nature but staggered in time from each other. But, because each signal is a function of the signal at its input, when the signals Ⓐ and Ⓑ are used to modulate quadrature carrier signals, each signal modulates the carrier signal in two different phases to provide a four-phase modulated signal.

A dither circuit 43 receives as its inputs a control signal, and the signal present at the output of the VCO 36. The dithering circuit 43 functions to oscillate the phase of the signal from the VCO 36 before the signal is applied to the two-phase to four-phase encoder 32. The control signal functions to control the rate of dither, which rate is adjusted to provide efficient system operation. The signal passed by switch 37 controls the phase and frequency of the VCO 36. The VCO 36 is synchronized to the pseudo-random sequence of the received signal when the system is in a loaded condition. When the system is in an unlocked condition switch 37 under the control of the signal from the PN lock detector 38 switches to take its input from the terminal labeled "search voltage." The search voltage is of such a magnitude that it will drive the VCO 36, which in turn will drive the PN generator 35, to cause the rate of the locally generated PN sequence to sweep to a position with respect to the received PN sequence which position will provide a lock detection signal at the output of the lock detector 38.

Figure 3:
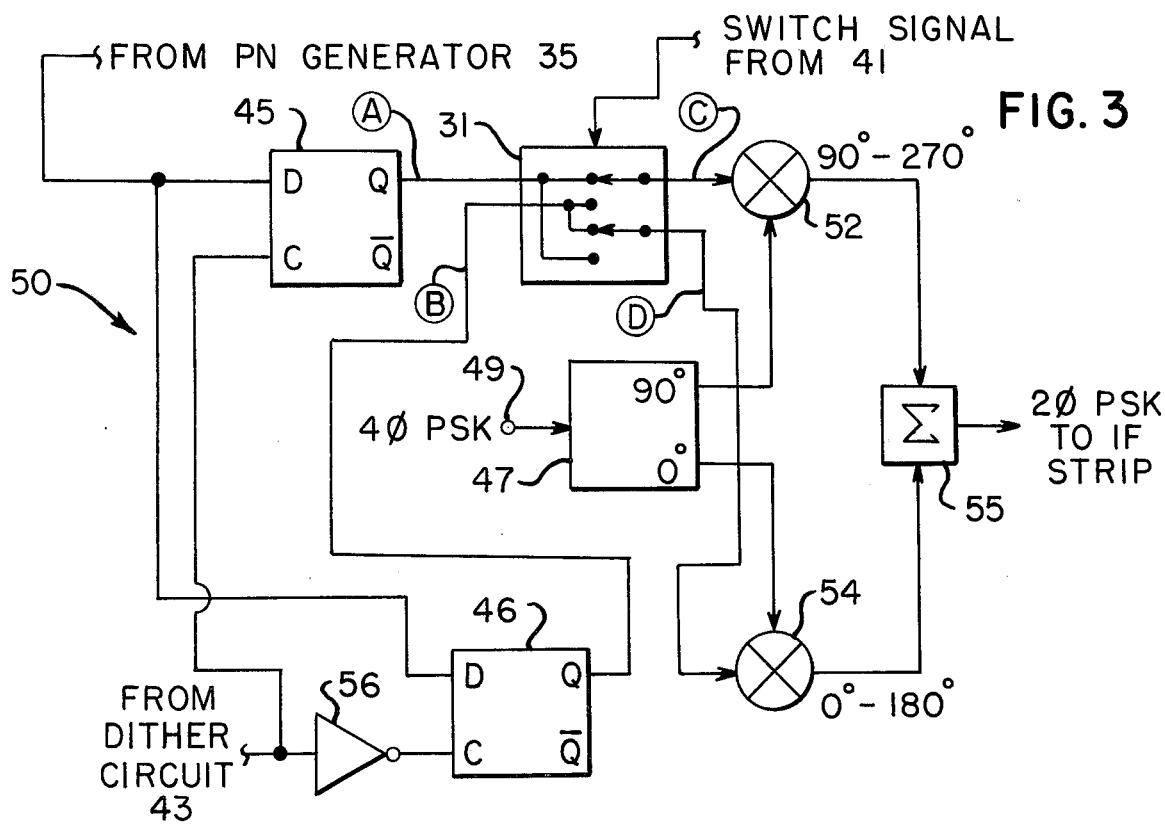
FIG. 3 is a detailed block schematic diagram of the demodulator of the present invention.

Referring now to FIG. 3 wherein a more detailed block diagram of the demodulator, or spectrum collapsing circuit, 50 is shown; the PN sequence signal from the PN generator 35 is directed to the D inputs of the D-type flip-flops 45 and 46. The dithered signal from the dither circuit 43 is applied to the C input of flip-flop 45 and to the C input of flip-flop 46, after a logic inversion which takes place in the inverter 56. The Q output terminal of flip-flop 45 is connected to the Ⓐ labeled line of switch 31. The Q output terminal of flip-flop 46 is connected to the Ⓑ labeled line of switch 31. Switch 31 is so constructed that a signal present on the lines Ⓐ and Ⓑ can be connected in one state to the lines labeled Ⓒ and Ⓓ respectively, and in the other state connected to the lines labeled Ⓓ and Ⓒ respectively. The state of the switch 31 is controlled by the switching signal from the OR gate 41 shown in FIG. 2. The line Ⓒ from switch 31, is connected to an input of a mixer 52. The mixer 52 may be a balanced mixer. The line Ⓓ, from switch 31, is connected to an input of a balanced mixer 54. The received four-phase PSK modulated spread spectrum signal is applied to terminal 49. Terminal 49 is connected to a phase splitting circuit 47. The phase splitting circuit 47 provides two output signals, one having a 0° phase shift and the other having a 90° phase shift. The 0° phase shift signal is applied to an input of the balanced mixer 54 and the 90° phase shift signal is applied to an input of the balanced mixer 52.

In operation, the 90° phase shifted signal to the balanced 52 will shift the phase of the signal received on the Ⓒ labeled input to the balanced mixer by either 90° or 270° depending on the level of the signal from the phase splitter. The 0° phase shifted signal applied to an input of the phase mixer 54 will shift the phase of the signal present on the Ⓓ labeled input by either 0° or 180° depending upon the level of the 0° phase shifted signal. The signals from the balanced mixers 52 and 54 are added together by a summing circuit 55. Each of the balanced mixers 52 and 54 remove one-half of the pseudo-random modulation sequence such that a combining of the two signals from the balanced mixer by the summer 55 removes totally the PN modulation sequence from the PSK modulated signal. Removal of the PN sequence operates to effectively collapse the spectrum of the spread spectrum signal to its original bandwidth, while summing the two signals from the balanced mixers also removes the four-phase feature of the received signal such that the output signal from the summer 55 is a two-phase PSK modulated signal of narrow bandwidth.

In order to effectively accomplish the spectrum collapse of the received signal, it is necessary to properly phase the locally generated PN sequence with respect to the received PN sequence such that cancellation takes place. This phasing is accomplished by rotating the phase map of the locally generated four-phase PN sequence signal about the 0° and 180° axis. Electronically this is accomplished by the use of switch 31. Switch 31 in one position connects the Ⓐ and Ⓒ lines and the Ⓑ and Ⓓ lines together. In the other position the switch connects the Ⓐ and Ⓓ lines and the Ⓑ and Ⓒ lines together. In an unlocked condition the switch 31 responds to the square wave signal from the oscillator 40 to toggle back and forth so as to continually reverse the connections between the Q outputs of the flip-flops 45 and 46 and the Ⓒ and Ⓓ lines connected to the balanced mixers 52 and 54.

Figure 4A:
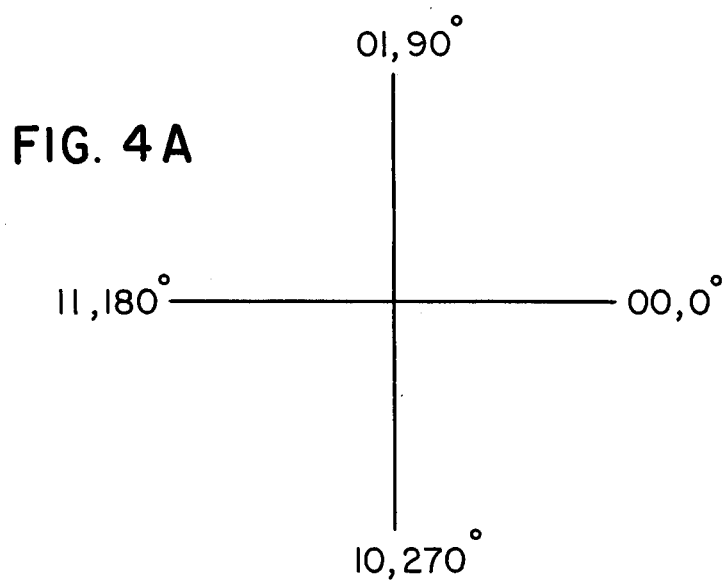
FIGS. 4A and 4B are phase vectors useful in understanding the operation of the demodulator of FIGS. 2 and 3.
Figure 4B:
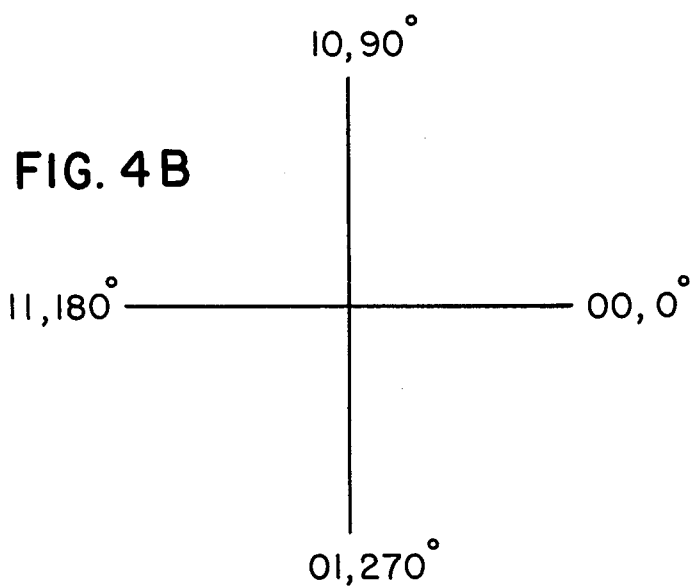

FIGS. 4A and 4B illustrate the principal of rotating the phase map of the spectrum collapsing circuit 50. In FIG. 4A the 90° and 270° phase vectors correspond to the 01, and 10, digital symbols respectively. In FIG. 4B the 90° and 270° phase vectors correspond to the 10, and 01, digital symbols respectively. This reversal is brought about by reversing the inputs to the respective double balanced mixers utilizing the switch 31.

Referring back momentarily to FIG. 2 in conjunction with FIG. 3, the demodulator 50 is shown comprised of the correlator 30, the switch 31 and the two-phase to four-phase encoder 32. In FIG. 3 the correspondence in terms of components are: the flip-flops 45 and 46 along with the inverter 56 form the two-phase to four-phase encoder 32, the switch 31 corresponds to the switch block 31, and the correlator 30 corresponds to the balanced mixers 52 and 54 along with the phase shift circuit 47, and the summing circuit 55.

While there has been shown what is considered to be the preferred embodiment of the invention, it will be manifest that many changes and modifications may be made therein without departing from the essential spirit of the invention. It is intended, therefore, in the annexed claims, to cover all such changes and modifications that may fall within the true scope of the invention.

What is claimed is:

1. A demodulator for collapsing the spectrum of a received signal which is a spread spectrum phase shift keyed modulated carrier signal comprising:
   generator means for generating a local carrier signal corresponding to the spread spectrum signal portion of said received signal;
   correlator means for correlating the generated local carrier signal with the received signal so as to collapse the spread spectrum signal portion of said received signal; and
   reversing means interposed between said generator means and said correlator means for changing the correlation relationship of components of the signal from said generated local carrier signal with the spread spectrum signal portion of said received signal.

2. The demodulator according to claim 1 and further comprising:
   means responsive to the degree of correlation between the spread spectrum signal portion of said received signal and said generated local carrier signal for providing a control signal to said reversing means for switching said reversing means to a state which maximizes the degree of correlation.

3. The demodulator according to claim 1 and further comprising:
   synchronizing means responsive to the degree of correlation between the spread spectrum signal portion of said received signal and said generated local carrier signal for controlling the rate of said generated local carrier signal so as to synchronize said generated local carrier signal with the spread spectrum signal portion of said received signal.

4. The demodulator according to claim 1 wherein the spread spectrum of said received signal is generated by modulating a carrier signal with a pseudo-random sequence signal, and wherein said generator means is a means for generating a local pseudo-random sequence signal corresponding to the pseudo-random sequence signal used to modulate the carrier signal of said received signal.

5. The demodulator according to claim 4 wherein the pseudo-random sequence signal used to modulate the carrier signal of the received signal is four phase encoded and wherein said demodulator is further comprised of:
   encoder means interposed between said reversing means and said generating means for encoding said local pseudo-random sequence signal in four phase.

6. A demodulator for collapsing the spectrum of a received signal which signal is a four phase PSK modulated carrier signal having a spread spectrum component which component was generated by modulating said carrier signal with a pseudo-random sequence signal, said demodulating comprising:
   means for generating a local pseudo-random sequence signal corresponding to the pseudo-random sequence signal used for modulating said carrier signal;
   encoder means receiving said local pseudo-random sequence signal for four phase encoding said signal;
   correlator means for correlating the signal from said encoder means with the received signal so as to collapse in-common signal components; and reversing means interposed between said encoder means and said correlator means for changing the correlation of components of the signal from said encoder means with the received signal so as to effect cancellation of in-common signal components thereby collapsing the spectrum of said received signal.

7. The demodulator according to claim 6 and further comprising:
means responsive to the degree of correlation between the signal from said encoder means and said received signal for providing a control signal to said reversing means for switching said reversing means to a state which maximizes the degree of correlation.

8. The demodulator according to claim 6 and further comprising:
synchronizing means responsive to the degree of correlation between the signal from said encoder means and the received signal for controlling the rate of the local pseudo-random sequence signal, so as to synchronize the signal from said encoder means with said received signal.

9. A demodulator comprising:
phase splitting means responsive to a received signal for dividing said received signal into two signals shifted in phase with respect to each other;
means for generating a local carrier signal corresponding to a signal component contained in the received signal;
encoding means responsive to said local carrier signal for encoding said local carrier signal into two signals each corresponding to signal components contained in the received signal;
correlating means for correlating each signal from said phase splitting means against the signals from said encoding means; and
switch means interposed between said encoding means and said correlating means for altering the phase correlation of signals from said encoding means to said correlating means so as to maintain a maximum correlation between the signals from said phase splitting means and the signals from said encoding means.

10. The demodulator according to claim 9 wherein said correlating means is comprised of:
a pair of balanced mixers each adapted to compare one signal from said phase splitting means with one signal from said encoding means; and
a summing means for summing the compared signal from said balanced mixers to provide a combined signal.

11. The demodulator according to claim 9 wherein said encoding means divides said local carrier signal into two signals staggerd in time one from the other.

12. The demodulator according to claim 9 and further comprising:
dithering means for oscillating the phase of the signals from said encoding means as they are applied to said correlating means.

* * * * *